UNITED STATES PATENT OFFICE.

RICHARD LÜDERS, OF STEGLITZ, GERMANY, ASSIGNOR TO FARBWERKE VORM. MEISTER LUCIUS & BRÜNING, OF HÖCHST-ON-THE-MAIN, GERMANY, A CORPORATION OF GERMANY.

1-IODO-2.3-DIHYDROXYPROPANE AND PROCESS OF MAKING SAME.

1,230,185.   Specification of Letters Patent.   Patented June 19, 1917.

No Drawing.   Application filed June 15, 1915.   Serial No. 34,193.

*To all whom it may concern:*

Be it known that I, RICHARD LÜDERS, Ph. D., chemist, a citizen of the Empire of Germany, residing at Steglitz, near Berlin, Germany, have invented certain new and useful Improvements in 1-Iodo-2.3-Dihydroxypropane and Processes of Making Same, of which the following is a specification.

I have found that by treating α-chlorhydrin with iodids of the alkali metals a new compound is obtained, which is readily soluble in water and alcohol; it constitutes a thick oil which, when sufficiently pure, solidifies so as to form a solid compound melting at 48–49° C. and to which the constitution of a 1-iodo-2.3-dihydroxypropane $ICH_2-CH(OH)-CH_2OH$ must be attributed.

A pure and easily crystallizing product is obtained only if the reaction of the α-chlorhydrin with the iodids of the alkali metals takes place at a temperature not exceeding 90° C. and if the light is excluded, because under the influence of the latter a secondary reaction occurs which becomes apparent by the brown coloration of the solution.

The new compound is used for medicinal purposes as a substitute for potassium iodid and the well-known organic iodin compounds and it is of great therapeutic value, as it can be administered intravenously as well as subcutaneously, externally and per os.

The following example illustrates my invention:

50 parts of α-chlorhydrin are digested in the dark at 30–35° C. for several days, while shaking, with 75 parts of dry, very finely powdered sodium-iodid. From the product of the reaction the iodohydroxypropane may be isolated by first filtering off the salts and washing afterward with alcohol or ethyl acetate. From the filtrates, the washing-agent is distilled off and the residue is then heated to about 75° C. as long as there is still separation of a salt. This is filtered and again washed in the manner above indicated. From the solution the alcohol and the ethyl acetate respectively are distilled off, the residue, after being diluted with water, is decolorized by introducing sulfurous acid and the excess of the latter removed by a current of air, whereupon the mass is extracted with ether and ethyl acetate and the solvents added are distilled off. The residue thus obtained is a thick oil, readily soluble in water, alcohol and ethyl acetate, less soluble in benzene, which when standing in a vacuum over calcium chlorid forms crystals melting at 48–49° C.

Having now described my invention, what I claim is:

1. The process of preparing 1-iodo-2.3-dihydroxypropane, which consists in treating α-chlorhydrin with iodids of alkali metals.

2. The process of preparing 1-iodo-2.3-dihydroxypropane, which consists in treating α-chlorhydrin with iodids of alkali metals at a temperature not exceeding 90° C.

3. The process of preparing 1-iodo-2.3-dihydroxypropane, which consists in treating α-chlorhydrin with iodids of alkali metals at a temperature not exceeding 90° C. while excluding light.

4. The process of preparing 1-iodo-2.3-dihydroxypropane which consists in treating α-chlorhydrin with sodium iodid.

5. The process of preparing 1-iodo-2.3-dihydroxypropane which consists in treating α-chlorhydrin with sodium iodid at a temperature not exceeding 90° C., while excluding light.

6. As article of manufacture, the hereinbefore described new compound to which the constitution of a 1-iodo-2.3-dihydroxypropane may be attributed, being readily soluble in water, alcohol and ethyl acetate, less soluble in benzene, constituting a thick oil, which, when sufficiently pure, solidifies into crystals melting at 48–49° C.

In testimony whereof I affix my signature in presence of two witnesses.

RICHARD LÜDERS.

Witnesses:
 WOLDEMAR HAUPT,
 HENRY HASPER.